W. E. TAFT.
VALVE FOR INTERNAL COMBUSTION ENGINES.
APPLICATION FILED MAR. 1, 1915.
1,195,868.
Patented Aug. 22, 1916.
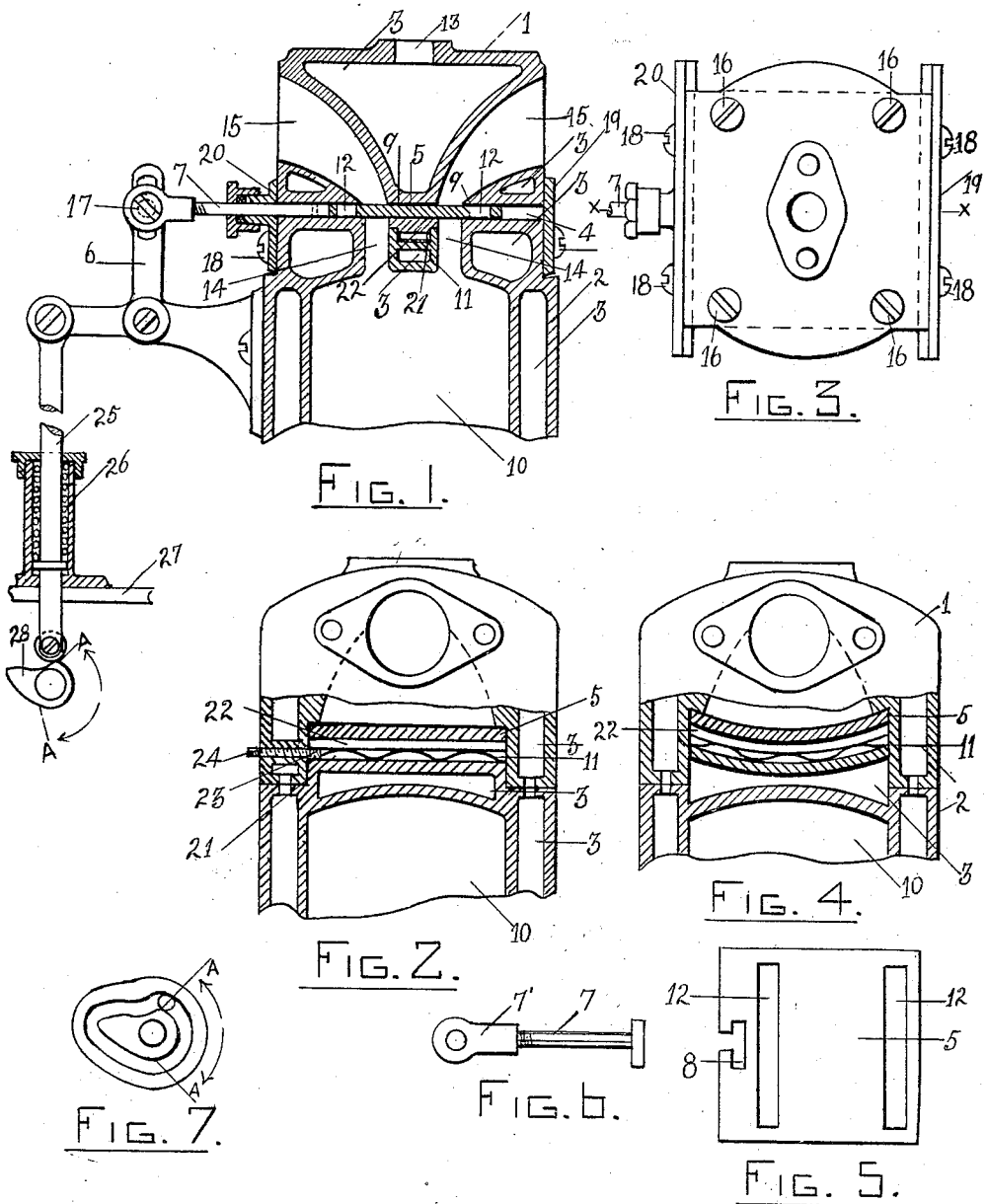

UNITED STATES PATENT OFFICE.

WALTER E. TAFT, OF PROVIDENCE, RHODE ISLAND.

VALVE FOR INTERNAL-COMBUSTION ENGINES.

1,195,868.      Specification of Letters Patent.      Patented Aug. 22, 1916.

Application filed March 1, 1915. Serial No. 11,121.

*To all whom it may concern:*

Be it known that I, WALTER E. TAFT, a citizen of the United States, residing at Providence, in the county of Providence and State of Rhode Island, have invented certain new and useful Improvements in Valves for Internal-Combustion Engines, of which the following is a specification.

This invention relates to reciprocating or slide valves; and has for its object the elimination of friction, the promotion of structural and operative simplicity, the attainment of ease of assembling and disassembling, the avoiding of carbon deposits, practical unrestricted size of ports and elimination of friction and wire drawing of the intake charge or the exhaust and protection of the valve from overheating and warping and the faces of the valve and the valve seat from the effects of the hot gases.

The invention consists of a reciprocating flat valve or of the form of a segment of a hollow cylinder, mounted in a removable valve chamber outside of the combustion chamber and seated outwardly therefrom, or at the side of the valve farthest away from the combustion chamber, said valve chamber being surrounded by water chambers and said valve held to its seat during the compression and explosion stroke by the force of same upon the back of the valve, and operated by means of a valve stem, a bell crank through a tappet rod and cam, as I will proceed now to explain and finally claim.

In the accompanying drawings illustrating the invention, in the several figures of which like parts are similarly designated, Figure 1 is a vertical section taken on the line *x x* of Fig. 3 showing the upper part of an engine cylinder the valve chamber and the valve connected therewith. Fig. 2 is a transverse view of same partly in section showing a flat spring and shoe at the back of the valve to overcome the weight of same. Fig. 3 is a plan view. Fig. 4 is a view representing a modification whereby a valve in the shape of an arc of a circle is shown having all the functions of and the same operative means as shown in Figs. 1 and 2. Fig. 5 is a plan view of a flat valve. Fig. 6 is a view of a valve stem and adjustable connection to facilitate the setting of the valve. Fig. 7 is a view of an internal cam.

Referring to Figs. 1 and 2, 1 and 2 is the cylinder casing; 3 is the water cooling chamber; 4 is the valve chamber surrounded by water chambers 3 except at the ends and 5 is the valve, made as a flat plate. This valve is connected with the bell crank 6 on the exterior, by means of the stem 7 which is yieldingly held in slot 8 of the valve 5, 9 indicates the valve seat at the upper side of valve chamber 4. 10 may indicate the combustion chamber.

The stem 7 is given a reciprocating motion by any suitable means from the exterior, such as a bell crank connected with a moving part so as to impart a reciprocating or sliding movement to the valve 5. The spring 11 serves primarily to overcome the weight of the valve that it may not drop from its seat during the moment of no compression or force from the explosion upon the back of the valve to hold it to the seat, said spring 11 being placed in the slot 21 bearing upon the back of the shoe 22 and said shoe 22 bearing upon the back of the valve 5; said shoe 22 also serves to automatically clean the back of the valve 5 by a scraping process when the valve is in motion; the spring 11 is placed in a slot 21 having a block 23 at one end, and a screw 24 passing through the cylinder casing and bearing against said block, said screw being used to force the block 23 against the end of spring 11 to give more or less force of the spring against the back of the shoe 22 to hold the valve 5 to its seat. The valve 5 is located in a valve chamber 4 with water chambers 3 surrounding said valve chamber, and this valve chamber is large enough to permit the movement of the valve to cover and uncover the cylinder ports presently described. This valve is provided with ports 12 which are adapted to be brought into and out of the register with the ports 14 and 15 in the cylinder leading to the combustion chamber. The ports 14 and 15 may be used either as inlet or exhaust as required.

By the construction shown in Figs. 1 and 2 the inlet charge is kept separate from the exhaust at all times, since the ports are separately incased. The cylinder is made in two parts 1 and 2, the part 1 with the valve chamber 4 being easily removed or separated from the lower part of cylinder 2 by removing screws 16, pin 17 in the bell crank and screws 18 in plates 19 and 20.

In the operation of the valve 5 I use what is termed a double acting cam 28, which opens and closes the exhaust port, and the intake port in one revolution of the cam, the valve remaining stationary in a closed position during the movement of the cam 28 between the points A A and as shown in Fig. 7, being the compression and explosion stroke of the engine, at which time the valve is held rigidly to its seat from the force of the compression and explosion upon the back of that part of the valve 5 which covers the ports 14 and 15. As shown in Fig. 1 I use a spring 26 to keep the tappet in contact with the cam 28 at all times, the spring 26 may be eliminated by using the internal cam shown in Fig. 7.

In the foregoing drawings and specification an entirely new and novel feature in valves for internal combustion engines is shown and explained, the specific points being a non friction slide valve when in motion, a valve depending upon the compression or the explosion of the gases to hold it with an excess force to its seat, complete protection of the valve the face of the valve and its seat from the action of the hot gases upon same and a non movable valve when there is an excess amount of pressure upon the back of same, also a valve that is protected from the excess heat of the hot gases, as the valve is surrounded by water chambers, with the exception of that part covering the ports, and this part being exposed to the direct heat of the hot gases only one fourth of the time, or during the explosion stroke of the engine, it is impossible to overheat the valve and cause it to warp; this is an essential and important factor and necessary in using valves of this kind, and one of the inventive elements I claim all of which tend to prolong the life of the valve and working parts.

I do not confine myself to the exact position of the valve in relation to the cylinder as the same may be used in any position where operative means may be connected thereto, nor do I confine myself to the exact construction shown as the same may be varied without departing from the spirit of the invention, and the same can be applied to one, two or more cylinders cast in pairs or *en bloc*.

In the matter of the valve seat as described above, I designate the same in my claims by using the word "outwardly".

I claim:—

1. In an internal combustion engine, a cylinder, a removable valve chamber outside of the cylinder chamber, water chambers surrounding said valve chamber, ports for inlet and exhaust, a reciprocating valve arranged within said valve chamber whereby only the back of the valve covering the ports between the valve chamber and the cylinder chamber shall be in contact with, or exposed to the hot gases, during the explosion stroke, said valve having its face outwardly, a shoe bearing against the back of the valve, a spring at the back of the shoe to force the valve to its seat, a valve stem connected to the valve, and said valve stem connected with operative means from the exterior to impart a reciprocating movement to the valve and allow the valve to remain stationary during the compression and firing stroke of the engine.

2. In an internal combustion engine, a cylinder, a removable valve chamber outside of the cylinder chamber, water chambers surrounding said valve chamber, ports for inlet and exhaust, a valve arranged within said valve chamber for reciprocating motion, a shoe bearing against the back of the valve, a spring bearing against the back of the shoe, means for causing the spring to have more or less tension to force the shoe against the back of the valve and imparting such force to the valve against its seat, a valve stem connected to the valve, said valve stem connected with operative means from the exterior to impart a reciprocating movement to the valve to register and unregister with the ports and allow the valve to remain stationary during the compression and explosion stroke of the engine.

3. In an internal combustion engine, the combination of a ported cylinder, a removable valve chamber, a valve arranged in the valve chamber, a shoe bearing upon the back of the valve, a spring bearing upon the back of the shoe, means for compressing the spring for more or less force upon the back of the shoe, a valve stem connected to the valve, said stem connected with movable parts from the exterior to give an operative reciprocating motion to the valve, said valve having ports to be brought in and out of register with the ports in the cylinder as the valve is reciprocated, said valve having its seat outwardly and remaining in a stationary position covering the ports during the compression and explosion strokes and held to its seat by the action of the spring, force of the compression or explosion upon the back of the valve and operative means for movement of the valve when released from the excess force of the compression and explosion.

WALTER E. TAFT.

Witnesses:
 Oscar L. Plumb,
 John O'Donnell.

Copies of this patent may be obtained for five cents each, by addressing the "Commissioner of Patents, Washington, D. C."